(12) United States Patent
Rubia et al.

(10) Patent No.: US 10,228,107 B2
(45) Date of Patent: Mar. 12, 2019

(54) ILLUMINATION MODULE FOR A MOTOR VEHICLE

(71) Applicant: VALEO ILUMINACION, Martos (ES)

(72) Inventors: Juan-Antonio Rubia, Martos (ES);
Leandro Rodriguez, Martos (ES);
Ramon Sanchez, Martos (ES);
Juan-Francisco Moreno, Martos (ES);
Damien Cabanne, Martos (ES);
Ricardo Fernandez, Martos (ES); Eric Moisy, Martos (ES)

(73) Assignee: VALEO ILUMINACION, Martos (ES)

( * ) Notice: Subject to any disclaimer, the term of this patent is extended or adjusted under 35 U.S.C. 154(b) by 0 days.

(21) Appl. No.: 15/643,989

(22) Filed: Jul. 7, 2017

(65) Prior Publication Data
US 2018/0010752 A1    Jan. 11, 2018

(30) Foreign Application Priority Data

Jul. 7, 2016   (FR) ..................................... 16 56527

(51) Int. Cl.
| | |
|---|---|
| *F21S 41/141* | (2018.01) |
| *F21S 43/14* | (2018.01) |
| *B60Q 3/00* | (2017.01) |
| *F21S 43/19* | (2018.01) |
| *F21S 43/145* | (2018.01) |
| *F21W 106/00* | (2018.01) |

(52) U.S. Cl.
CPC .............. *F21S 41/141* (2018.01); *B60Q 3/00* (2013.01); *F21S 43/14* (2018.01); *F21S 43/145* (2018.01); *F21S 43/19* (2018.01); *F21S 43/195* (2018.01); *B60Q 2400/00* (2013.01); *F21W 2106/00* (2018.01)

(58) Field of Classification Search
CPC ..... F21Y 2115/10; F21S 41/192; F21S 43/14; F21S 43/195; F21S 41/141; F21S 41/19; F21S 41/155; F21S 45/10; F21S 43/145; F21S 43/19
See application file for complete search history.

(56) References Cited

U.S. PATENT DOCUMENTS

| | | | |
|---|---|---|---|
| 6,715,909 B2 * | 4/2004 | Serizawa ............... | B60Q 1/302 362/362 |
| 7,140,760 B2 * | 11/2006 | Kidd .................... | B60Q 1/0064 362/549 |

(Continued)

FOREIGN PATENT DOCUMENTS

| | | |
|---|---|---|
| EP | 2 927 567 A1 | 10/2015 |
| WO | WO 2015/092034 A1 | 6/2015 |

OTHER PUBLICATIONS

French Preliminary Search Report dated Jan. 24, 2017 in French Application 16 56527 filed on Jul. 7, 2016 (with English Translation of Categories of Cited Documents).

*Primary Examiner* — Christopher Stanford
(74) *Attorney, Agent, or Firm* — Oblon, McClelland, Maier & Neustadt, L.L.P.

(57) ABSTRACT

The invention relates to an illumination module for a motor vehicle employing at least one organic electroluminescent diode. The module includes at least one conductor wire connecting a first conductor terminal of the at least one organic electroluminescent diode to a second conductor terminal of a support wherein at least one organic electroluminescent diode is received.

20 Claims, 2 Drawing Sheets

(56) References Cited

U.S. PATENT DOCUMENTS

| | | | |
|---|---|---|---|
| 2006/0239021 A1* | 10/2006 | Inaba | B60Q 1/0041 362/538 |
| 2009/0001490 A1* | 1/2009 | Bogner | H01L 25/0753 257/432 |
| 2013/0092960 A1* | 4/2013 | Wilcox | H01L 33/08 257/88 |
| 2015/0285470 A1 | 10/2015 | Hatanaka et al. | |
| 2015/0300618 A1 | 10/2015 | Chou et al. | |
| 2016/0298818 A1 | 10/2016 | Duarte et al. | |

* cited by examiner

ILLUMINATION MODULE FOR A MOTOR VEHICLE

BACKGROUND

The field of the present invention is that of lighting and/or signaling devices for motor vehicles, and the present invention relates more particularly to lighting and/or signaling devices that employ at least one organic electroluminescent diode.

The lighting and/or signaling devices of a motor vehicle have, first, to meet functional criteria, such as the illumination power and the precise arrangement required for producing a specific, approved beam, or, alternatively, a long service life, minimal overall size, and ease of use, and they must, second, meet esthetic conditions imposed by automobile constructors connected with the visual identification of their vehicle.

The use of illumination sources that use one or more electroluminescent diodes has become commonplace.

The use of organic electroluminescent diodes, which are also designated herein by the acronym OLED (Organic Light-Emitting Diode), has recently increased and these are conventionally composed of two electrodes (an anode and a cathode) between which are placed at least one emission layer, produced from an electroluminescent material, plus an assembly of electron transport layers, the emission layer and the electron transport layers all being produced from organic materials. A voltage has to be applied between the two electrodes in order to excite the transport layers and the emission layer and to obtain the electroluminescence of the material constituting said emission layer.

Although the illumination power emitted by an OLED-type source remains lower than that emitted by a non-organic electroluminescent diode (or LED for Light-Emitting Diode) source, such sources are increasingly used in the automobile field both for actual vehicle lighting or signaling and for esthetic reasons, in particular the visual, luminous signature of the vehicle.

An OLED illumination module for a motor vehicle is generally composed of an emissive part arranged opposite a lens of a headlamp and a connection part via which this illumination module is connected to a device for supplying electrical power to the vehicle lighting and/or signaling device and for controlling same. This connection part is a weak point of such modules, given the very nature of the materials of which the OLED module is composed and their mechanical properties and the plug-in force that the connection part has to withstand upon its insertion into a corresponding socket. The context of installation in a motor vehicle, which produces vibrations, accelerations or else thermal stresses, increases the risk of rupture of this non-robust connection.

BRIEF SUMMARY

The object of the invention is to remedy this drawback and to propose an illumination module for a motor vehicle that employs one or more OLED illumination sources and in which the risk of rupture of the electrical connection of these sources is minimized.

To that end, the invention relates to an illumination module for a motor vehicle employing at least one organic electroluminescent diode, that comprises at least one conductor wire connecting a first conductor terminal of said at least one organic electroluminescent diode to a second conductor terminal of a support in which said at least one organic electroluminescent diode is received. It is thus possible to space the conductor terminals to be connected apart from one another, without having to place them in direct contact, which makes it possible to avoid having to press the diode too heavily against the support and to risk breaking the diode.

"Illumination module" is understood to mean that the module may be a module for lighting up the road, a signaling module of the vehicle, or else a means for lighting up the interior of the vehicle.

Further, the term "wire" is understood to cover not only wires but also bands, or indeed corresponding forms.

According to various features of the invention, taken alone or in combination, it will be possible to provide that:
  said at least one organic electroluminescent diode and said support comprise respectively a plurality of first and of second conductor terminals, a conductor wire connecting each of the first conductor terminals to at least one of said second conductor terminals;
  the first and second conductor terminals are equal in number, a conductor wire being arranged between each pair formed by a first and a second conductor terminal;
  the first and second conductor terminals are arranged in series such that each first conductor terminal is opposite a corresponding second conductor terminal, the conductor wires extending substantially in parallel to one another;
  each of the conductor terminals of said at least one organic electroluminescent diode and each of the corresponding conductor terminals of the support of the latter are made from the same material;
  the conductor terminals of said at least one organic electroluminescent diode and the conductor terminals of the support comprise gold or copper;
  each second conductor terminal of the support is connected to a conducting track arranged on the latter, said conducting tracks of the support are connected in the form of a connector capable of interacting with a complementary connector of an electrical power supply and/or control device of a signaling and/or lighting assembly of the vehicle;
  the conductor terminals of said at least one organic electroluminescent diode are arranged on a portion of the latter designed to connect same to an electrical power supply and/or control device of the lighting and/or signaling system of the vehicle;
  the organic electroluminescent diode comprises a connection part configured in order to be housed in the support and an emissive portion extending outside the support, said first conductor terminals being carried by said connection part;
  each first conductor terminal of the connection part of said at least one organic electroluminescent diode is connected to a conducting track originating from an emission zone of the emissive portion of this diode;
  the number of first conductor terminals may be defined as a function of the emissive portion of the organic electroluminescent diode and in particular as a function of the number of distinct lighting surfaces that this emissive portion comprises; it is possible, in particular, to provide for there to be a negative power supply terminal, i.e. a terminal connected to ground, common to each lighting surface, and a positive power supply terminal specific to each lighting surface;

the emissive portion may comprise at least two emission zones, with a central emission zone and a peripheral emission zone; these at least two zones may be activated selectively;

the support comprises a base forming a cavity capable of receiving the connection part of said at least one organic electroluminescent diode; by way of example, the base may comprise means for holding said connection part in the cavity;

the second conductor terminals of the support are arranged on a raised portion extending a back wall of the cavity; in other words, the second terminals are arranged in line with the cavity, on the periphery of this cavity;

the raised portion is separated from the back wall by a step, the height of which is substantially equal to the thickness of said connection part designed to electrically connect said at least one organic electroluminescent diode;

the support comprises a protection cap capable of being positioned at the same time on the first conductor terminals of said at least one organic electroluminescent diode, on the conductor wires and on the second conductor terminals of the support;

the protection cap may be articulated with the base of the support between a closed position, in which it closes off the cavity and covers over the first conductor terminals of said at least one organic electroluminescent diode, the conductor wires and the second conductor terminals of the support, and an open position in which it allows access to these conductor elements and the interior of the cavity;

the cap may be secured permanently on the base of the support, by means of screwing or adhesive bonding;

the protection cap and the base of the support each comprise means capable of interacting to allow said protection cap to be held in position in relation to said base.

The invention relates also to a lighting and/or signaling device of a motor vehicle comprising a light module as has just been presented.

BRIEF DESCRIPTION OF THE DRAWINGS

These various elements, and also further features, details and advantages of the invention will become more clearly apparent from reading the description given below by way of illustration and with reference to the following figures.

DETAILED DESCRIPTION

Figure 1:
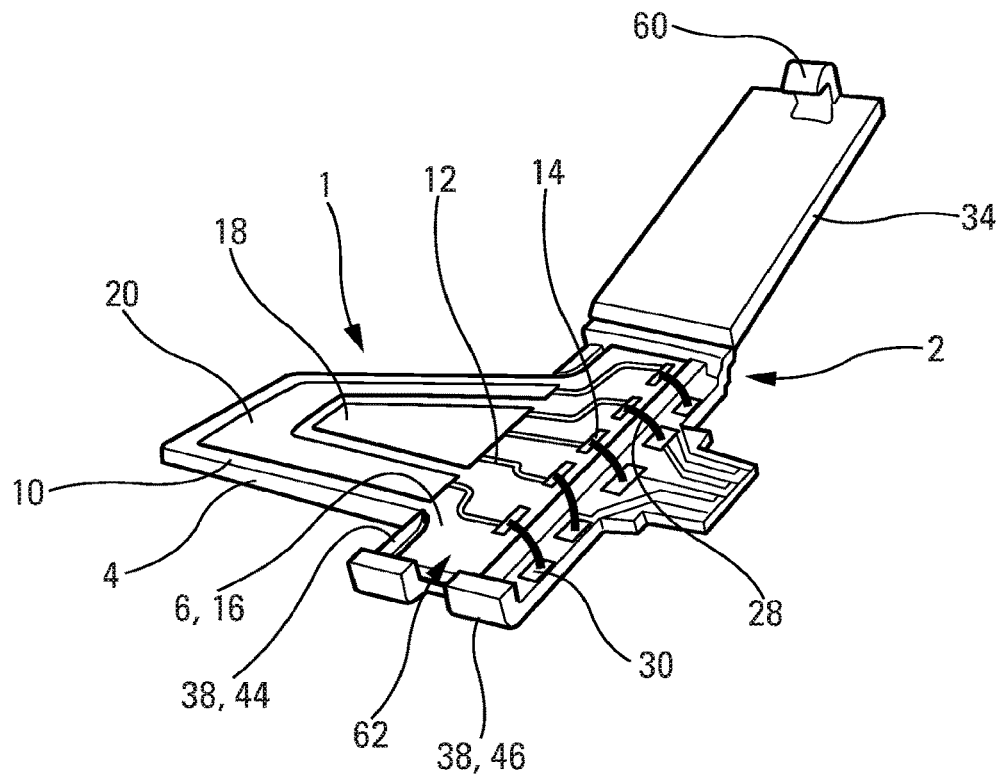
FIG. 1 is a schematic view in perspective of an illumination module according to the invention, in which an organic electroluminescent diode is mounted in position in a support, said support being in an open position.

It should first of all be noted that although the figures set out the invention in detail for its implementation, said figures may, of course, be used in order better to define the invention if necessary.

An illumination module according to the invention comprises at least one organic electroluminescent diode (or OLED, in the following text) 1, received in a support 2. The organic electroluminescent diode 1, illustrated on its own in FIG. 2, comprises an emissive part 4, and a connection part 6 designed to allow the electrical connection of the emissive part to a device for supplying electrical power to and/or controlling the signaling and/or lighting assembly of the vehicle, which is not shown here. The emissive part 4 is conventionally composed of a set of polymer layers sandwiched between an anode and a cathode, and it may have, taking into account the nature of the materials of which it is composed, a degree of mechanical flexibility. According to different embodiments, the emissive part 4 of the OLED 1 may comprise one or more distinct lighting surfaces. The connection part 6 is produced from an insulating material that is mechanically more rigid and, for example, and in a non-limiting manner, a glass or a polymer resin. According to the embodiment illustrated more particularly in the figures, it may be in the form of a substantially parallelepipedal plate from one of the major sides of which the emissive part 4 of the OLED 1 extends. In more detail, with reference to FIG. 2, in particular, the emissive part 4 of the OLED 1 extends the connection part 6 substantially in the same plane, from a first major side 8 of the plate forming said connection part, substantially at the centre of this first major side, such that shoulder edges 10 are arranged on either side of the emissive part.

In order to achieve the electrical connection of the OLED 1 with an electrical power supply and/or control device, conducting tracks 12 are arranged in the connection part 6. Each of these conducting tracks originates from the emissive part 4 of the OLED 1 and ends, on the plate forming the connection part 6 of the latter, in a first conductor terminal 14. Advantageously, the first conductor terminals 14 are all arranged on a first face 16 of the connection part 6, visible in FIGS. 1 and 2. It will be understood that the number of first conductor terminals 14 is defined as a function of the emissive part 4 of the OLED 1 and, in particular, as a function of the number of distinct lighting surfaces that the emissive part 4 of the OLED 1 comprises. Provision may in particular be made for there to be a negative supply terminal, i.e. connected to ground, common to each of the lighting surfaces, and a positive supply terminal specific to each of the lighting surfaces.

In the case illustrated, the emissive part 4 comprises two emission zones, with a central emission zone 18 and a peripheral emission zone 20. According to traffic conditions, or the esthetic effects sought, the control module associated with the lighting and/or signaling device may send an instruction for the central emission zone to light up, an instruction for the peripheral emission zone to light up, or an instruction for these two zones to light up simultaneously. As illustrated, provision has been made for a single negative terminal 22, common to the two emission zones, and four positive terminals. Two terminals 24 are connected to the central emission zone 18 and two terminals 26 are connected to the peripheral emission zone 20, two terminals being associated with each of the zones in order to facilitate uniform power supply to and lighting of the corresponding zone.

It will be understood that the number of first conductor terminals 14 is greater than the number of distinct lighting surfaces defined in the emissive part 4 of the OLED 1.

According to the invention, each of these first conductor terminals 14 of the OLED 1 is electrically connected, by means of a conductor wire 28, to a second conductor terminal 30 arranged on the support 2. In other words, the invention proposes producing an electric bridge between each first conductor terminal 14 of the OLED 1 and a corresponding second conductor terminal 30 of the support 2. Each first conductor terminal 14 should be connected to a second conductor terminal 30, it being understood that a single conductor terminal 30 could be provided for a plurality of first conductor terminals.

In the advantageous case of employing conductor wires dedicated respectively to a first and to a corresponding second conductor terminal, provision is made for the conductor terminals to be arranged in series such that each first conductor terminal is opposite a corresponding second conductor terminal, the conductor wires extending substantially in parallel to one another.

Advantageously, each of the conductor wires 28 has a diameter of the order of a few tens to a few hundreds of microns, and it comprises a core made from a material known for its electrical conducting properties, such as, for example, gold or copper. The material constituting the core of each conductor wire 28, whether this is, in the example given, gold or copper, is also chosen for the production of the first conductor terminals 14 of the OLED 1 and the second conductor terminals 30 of the support 2. More generally, it may be advantageous for the conductor terminals of the OLED 1 and of the support 2, 14 and 30 respectively, to be produced from the same material, chosen for its electrically conducting properties.

A description will be given below of the position of the second conductor terminals 30 in the support such that they are positioned optimally opposite the first conductor terminals 14, in order to facilitate the bridge using electrical wire.

Figure 2:
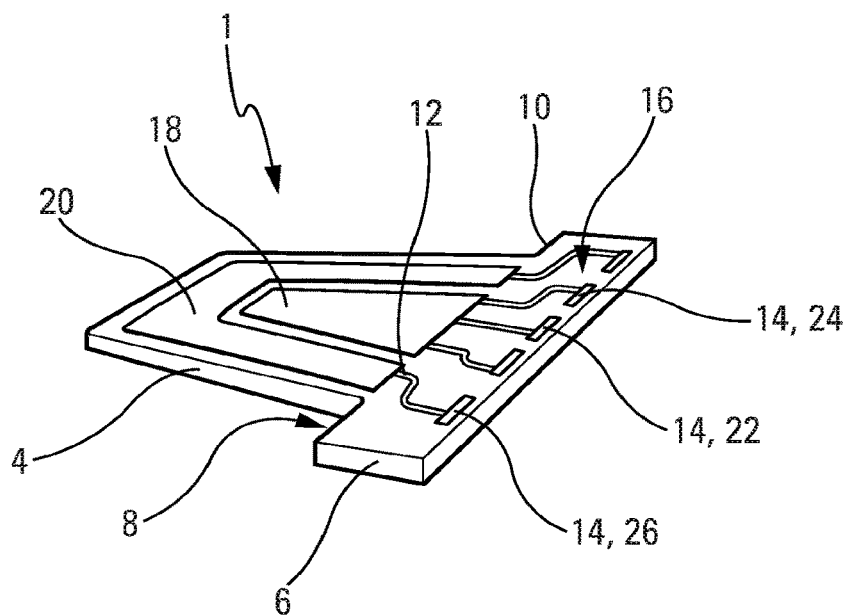
FIG. 2 is a schematic view in perspective of the organic electroluminescent diode illustrated in FIG. 1.
Figure 3:
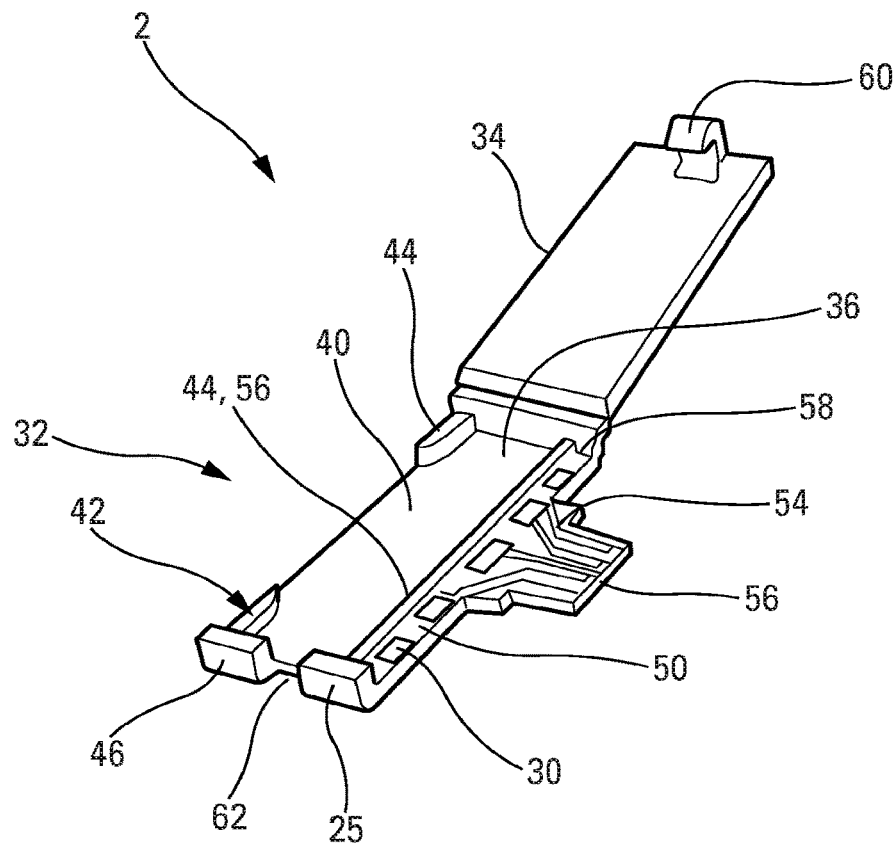
FIG. 3 is a schematic view in perspective of the mechanical support for receiving an organic electroluminescent diode as illustrated in FIG. 1, according to a particular embodiment of the invention.
Figure 4:
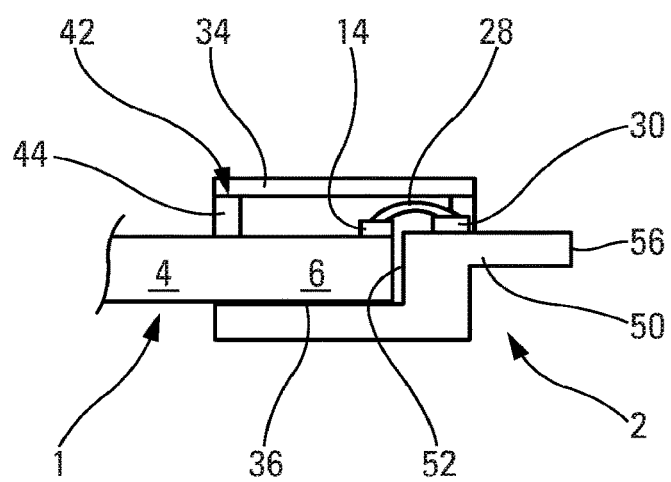
FIG. 4 is a sectional view of the illumination module according to the invention, the support being folded down in the closed position.

The support 2, illustrated on its own in FIG. 3, in a particular embodiment, comprises a base 32 and protection cap 34 mounted pivotably on one of the edges to allow an open position, illustrated in FIGS. 1 to 3, in which the base is perceivable and a closed position, illustrated in FIG. 4, in which the protection cap 34 covers over the base 32.

The base 32 has a back wall 36 in the form, according to the embodiment illustrated in the figures, of a substantially rectangular plate of which the dimensions are substantially identical to those of a lower face of the connection part 6 of the OLED 1, i.e. the face opposite the upper face 16 of this same connection part 6 on which the first conductor terminals 14 are arranged.

The base 32 further comprises lateral walls 38 bordering the back wall at least partially. The lateral walls extend the back wall 36 substantially perpendicularly, thereby defining a cavity 40 capable of receiving the connection part 6, the upper end 42 of these lateral walls 38, i.e. the end turned away from the back wall 36, being capable of acting as position stop for the protection cap 34 in the closed position thereof.

It will be understood that the lateral walls 38 make it possible to hold the plate forming the connection part 6 of the OLED 1 transversely inside the cavity while the back wall 36 and the protection cap 34, when it is in its closed position, hold said part vertically.

According to the embodiment illustrated more particularly in the figures, these holding means consist of a set of first lateral walls 44 arranged in parallel on the major sides of the back wall 36 and a set of second lateral walls 46 arranged in parallel along the smaller sides of the back wall 36.

More precisely, the lateral walls are defined and arranged such that, when the connection part 6 of the OLED 1 is received against the back wall 36 in the cavity 40, the first lateral walls 44 form a stop against the thickness of the major side of the plate forming said connection part 6, while the second lateral walls 46 form a stop against the thickness of the smaller side of the plate forming said connection part 6.

Together the lateral walls thus define a frame form in which the connection part 6 of the OLED 1 is received and held.

One of the first lateral walls 44 comprises an opening 48 dividing this first lateral wall 44 into two parts, defining a passage for the OLED 1. Thus, when the protection cap is folded down, the connection part 6 can be housed in the cavity of the support while the emissive part 4 can extend outside the support in order to play a part in the lighting and/or signaling function. The two parts of the first lateral wall 44 having the opening 48 form stops interacting with the shoulder edges 10 of the connection part 6 of the OLED 1.

As will be described below, the other first lateral wall 44 is associated with the different conductor terminals and with the wired electrical link, while the second lateral walls 46 are associated with the means of articulation and securing of the protection cap.

In a variant that is not shown, the base 32 of the support 2 may also comprise elements that make it possible to facilitate the engagement and positioning of the connection part 6 of the OLED 1 within the cavity 40 and, for example, a form capable of interacting with a complementary form defined on the connection part 6.

According to the embodiment of the invention illustrated in the figures, the second conductor terminals 30 of the support 2 are arranged on one of the major sides of the base 32, opposite the opening 48 allowing passage to the OLED. More precisely, as can be seen in FIG. 4, the second conductor terminals 30 of the support 2 are arranged on a raised portion 50 projecting from the back wall 36 of the cavity 40, said raised portion extending over the entire length, i.e. along a major side, of the base. The back wall 36 and the raised portion 50 are separated by a step 52 forming one of the two first lateral walls defining the cavity of the support. Advantageously, the height of this step 52 is substantially equal to the thickness of the plate forming the connection part 6 of the OLED 1, such that when the connection part is in position in the cavity of the support, the different conductor terminals to be connected together extend at the same height, i.e. at the same distance from the back wall 36, without a projecting wall between two conductor terminals to be connected.

This raised portion 50 has, on an upper face, i.e. a face turned away from the back wall, the second conductor terminals and conducting tracks 54. Each second conductor terminal 30 is thus connected to a conducting track 54 which are grouped together at the opposite end in the form of a connector 56 capable of interacting with a complementary connector of the electrical device of the vehicle, in order to electrically connect the latter to a device for supplying electrical power to and/or controlling the lighting and/or signaling assembly of the vehicle.

According to alternate embodiments that are not shown, the second conductor terminals 30 of the support 2, and also the associated conducting tracks 54 and the connector 56 that these latter form by grouping together, may be carried by a distinct component of the support 2 that is manufactured independently and attached to the latter when the electrical connection is made. In other words, the raised portion 50 may be produced as an independent component, distinct from the base 32 of the support 2. In such a case, the attachment of this raised portion 50, which carries the second conductor terminals 30, the conducting tracks 54 and the connector 56, to the base 32 of the support 2 can be effected, by way of non-exhaustive examples, by means of clipping or through the interaction of complementary bosses and notches carried, respectively, by these two components. One advantage of an embodiment of this type is that it allows separate manufacture, first, of the base 32 of the support 2, a simple plastics component that can be obtained at low cost by molding, and, second, of the connection component proper, which carries the second conductor terminals 30, the conducting tracks 54 and the connector 56.

It was pointed out above that the support 2, designed to receive an OLED 1 as described earlier and illustrated in the figures, comprises a protection cap 34 capable of closing the cavity 40 housing the diode. More precisely, this protection cap 34 is capable of being placed at the same time on the upper face 16 of the connection part 6 of the OLED 1, on the conductor wires 28 and on the second conductor terminals 30 of the support 2. Advantageously, the protection cap 34 thus has a substantially parallelepipedal form with dimensions that complement those of the base 32 of the support 2 and the raised portion 50, regardless of whether it is produced as a single component with the support or whether it is attached.

Just as it has been possible to specify above, the protection cap 34 is articulated with the base 32 of the support 2 by means of a hinge 58 formed on one of the two second lateral walls 46, the protection cap 34 thus being able to move between an open position in which it is rocked about its hinge 58 in order to allow access to the interior volume of the cavity 40 described above, and a closed position, which is not shown in the figures, in which it closes the cavity 40 described above and covers both the connection part 6 of the OLED 1 when the latter is housed in the support 2 and also the conductor wires 28 and the raised portion 50 on which the second conductor terminals 30 and the conducting tracks 54 of the support 2 are arranged.

Means for holding the protection cap in position may consist of a projection 60 arranged on the smaller side of the protection cap, opposite the side via which it is articulated with the base 32 of the support 2 by means of the hinge 58, and capable of interacting with a set of complementary forms arranged on the base 32 of the support 2. The projection 60 may be substantially in the form of a hook that engages in a notch 62 of the base 32 of the support 2 when the protection cap 34 is folded down on the connection part 6. The hook of the projection 60 thus engages under the base 32 of the support 2, thereby holding the protection cap 34 by means of clipping. The notch 62 may be is formed by a recess between two parts of the corresponding second lateral wall 46.

It should be noted that the support 2 and the protection cap 34 are configured such that, once the cap is placed in its closed position in which it covers the plate forming the connection part 6 of the OLED 1, the conductor wires 28 and the second conductor terminals 30 of the support 2, it does not enter into contact with the conductor wires 28. To that end, at least one of the walls (either the second lateral wall opposite the hinge 58 or the first lateral wall carrying the opening 48 for passage of the OLED) is raised relative to the second lateral wall separating the conductor terminals, in order to form a stop of the protection cap in the closed position which allows the passage of the conductor wires 28 between the raised portion 50 and the protection cap.

In this context, it is possible to envisage, according to alternate embodiments of the invention not shown in the figures, the internal face of the protection cap 34 being covered with a layer of insulating material having a degree of flexibility, for example a silicone. By exerting very light pressure on the conductor wires 28, such a layer of this type of material would make it possible to limit any potential vibration within the cavity 40 and to confer a degree of rigidity on the assembly.

The invention thus achieves its object by proposing an illumination module employing an OLED 1, the electrical connection of which has enhanced robustness both by virtue of the presence of the conductor wires 28 forming a bridge between the OLED 1 and its support 2, and by virtue of the particular form of the protection cap 34 of the support 2, which covers and protects the elements of the electrical connection, be these the conductor terminals of the OLED and its support indeed or the conductor wires forming the bridge between the connection part 6 of the OLED and the support 2.

The use of conductor wires to produce the electrical connection of the conductor terminals makes it possible to avoid direct contact between these terminals, which would require pressure to be exerted on the OLED when the latter is positioned in the support in order to achieve this direct contact. The fragility of the OLED in such a case would give rise to a risk of breakage.

It should, however, be noted that the invention is not restricted to the means and configurations described and illustrated but applies, likewise, to all equivalent means or configurations and to any combination of such means.

In particular, although the invention has been described above in an exemplary embodiment in which a single organic electroluminescent diode is associated with a single support in the illumination module in question, it goes without saying that the invention extends without limitation to those cases where a number of organic electroluminescent diodes are associated with one and the same support or those cases where the illumination module in question comprises a plurality of organic electroluminescent diodes and a plurality of supports. Similarly, the forms of the plate forming the connection part 6 of the OLED and of the support 2 described herein are indicative, and the invention extends also to any other form of connection part and of support, provided the support allows reliable positioning of the OLED so that the conductor terminals of the diode are opposite the conductor terminals of the support and that it is possible thus to achieve a rapid and secure wired connection.

The invention claimed is:

1. An illumination module for a motor vehicle comprising:
    at least one organic electroluminescent diode,
    a support in which said at least one organic electroluminescent diode is received, the support comprising a base and a protection cap attached to the base via a hinge positioned at a first end of the protection cap, and
    at least one conductor wire connecting a first conductor terminal of said at least one organic electroluminescent diode to a second conductor terminal of the support,
    wherein the protection cap is positioned directly over top of the conductor wires when the protection cap is in a closed position in which a second end of the protection cap contacts the base of the support.

2. The module according to claim 1, wherein said at least one organic electroluminescent diode and said support comprise respectively a plurality of first and of second conductor terminals, a conductor wire connecting each of the first conductor terminals to at least one of said second conductor terminals.

3. The module according to claim 2, wherein each of the conductor terminals of said at least one organic electroluminescent diode and each of the corresponding conductor terminals of the support of the latter are made from the same material.

4. The module according to claim 2, wherein each second conductor terminal of the support is connected to a conducting track arranged on the latter, said conducting tracks of the support being connected to a connector capable of interacting with a complementary connector of an electrical power supply and/or control device of a signaling and/or lighting assembly of the vehicle.

5. The module according to claim 2, wherein the conductor terminals are arranged on a connection part of the at least one organic electrolumiescent diode to connect the conductor terminals to an electrical power supply and/or control device of the lighting and/or signaling system of the vehicle.

6. The module according to claim 2, wherein the organic electroluminescent diode comprises a connection part configured in order to be housed in the support and an emissive portion extending outside the support, said first conductor terminals being carried by said connection part.

7. The module according to claim 2, wherein the first and second conductor terminals are equal in number, a conductor wire being arranged between each pair formed by a first and a second conductor terminal.

8. The module according to claim 7, wherein the first and second conductor terminals are arranged in series such that each first conductor terminal is opposite a corresponding second conductor terminal, the conductor wires extending substantially in parallel to one another.

9. The module according to claim 1, wherein each of the conductor terminals of said at least one organic electroluminescent diode and each of the corresponding conductor terminals of the support of the latter are made from the same material.

10. The module according to claim 1, wherein each second conductor terminal of the support is connected to a conducting track arranged on the latter, said conducting tracks of the support being connected to a connector capable of interacting with a complementary connector of an electrical power supply and/or control device of a signaling and/or lighting assembly of the vehicle.

11. The module according to claim 1, wherein the conductor terminals are arranged on a connection part of the at least one organic electrolumiescent diode to connect the conductor terminals to an electrical power supply and/or control device of the lighting and/or signaling system of the vehicle.

12. The module according to claim 11, wherein the base of the support forms a cavity capable of receiving the connection part of said at least one organic electroluminescent diode.

13. The module according to claim 12, wherein the second conductor terminals of the support are arranged on a raised portion extending a back wall of the cavity.

14. The module according to claim 13, wherein the raised portion is separated from the back wall by a step, the height of which is substantially equal to the thickness of said connection part designed to electrically connect said at least one organic electroluminescent diode.

15. The module according to claim 1, wherein the organic electroluminescent diode comprises a connection part configured in order to be housed in the support and an emissive portion extending outside the support, said first conductor terminals being carried by said connection part.

16. The module according claim 1, wherein each first conductor terminal of the connection part of said at least one organic electroluminescent diode is connected to a conducting track originating from an emission zone of the emissive portion of this diode.

17. The module according to claim 1, wherein the protection cap is capable of being positioned at the same time on the first conductor terminals of said at least one organic electroluminescent diode, on the conductor wires and on the second conductor terminals of the support.

18. The module according to claim 17, wherein the protection cap is articulated with the base of the support between the closed position, in which the protection cap closes off the cavity and covers over the first conductor terminals of said at least one organic electroluminescent diode, the conductor wires and the second conductor terminals of the support, and an open position in which the protection cap allows access to these conductor elements and the interior of the cavity.

19. The module according to claim 18, wherein the protection cap includes a projection to engage in a notch of the base of the support in the closed position to allow said protection cap to be held in position in relation to said base.

20. The module according to claim 17, wherein the protection cap and the base of the support each comprise means capable of interacting to allow said protection cap to be held in position in relation to said base.

* * * * *